(No Model.) 2 Sheets—Sheet 2.
M. KELLY.
BICYCLE SUPPORT.
No. 603,769. Patented May 10, 1898.
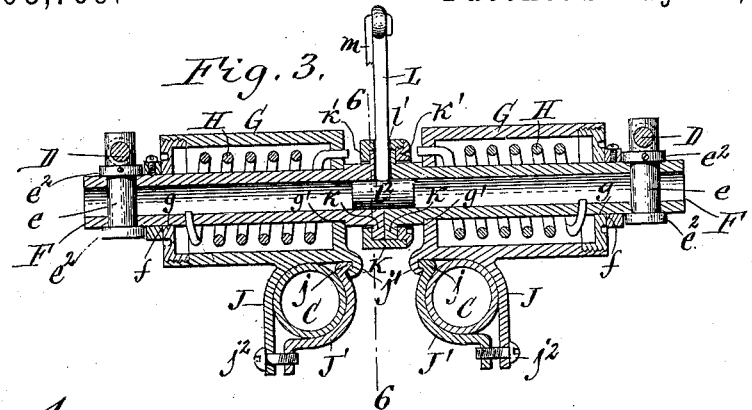
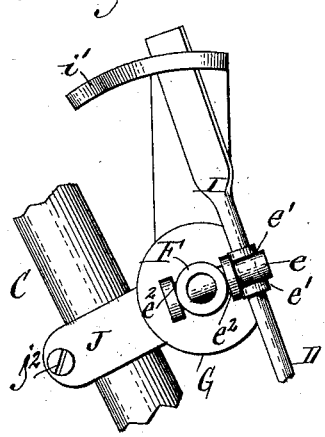
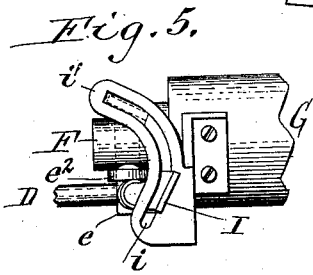
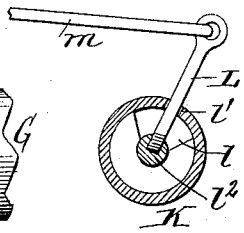
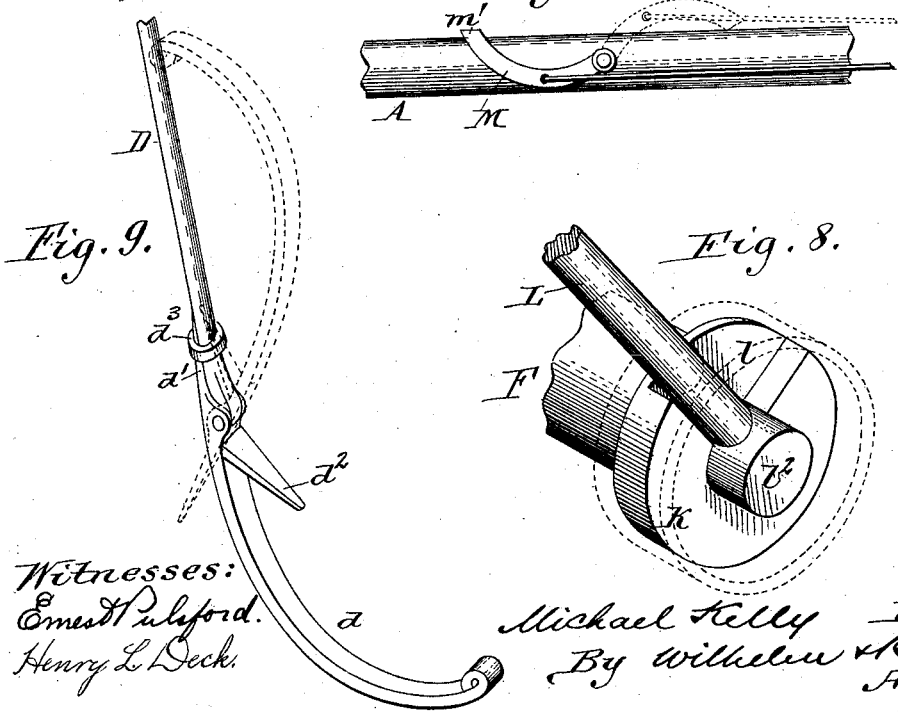
Witnesses:
Ernest Pulford.
Henry L. Deck.
Michael Kelly, Inventor.
By Wilhelm & Bonner, Attorneys.

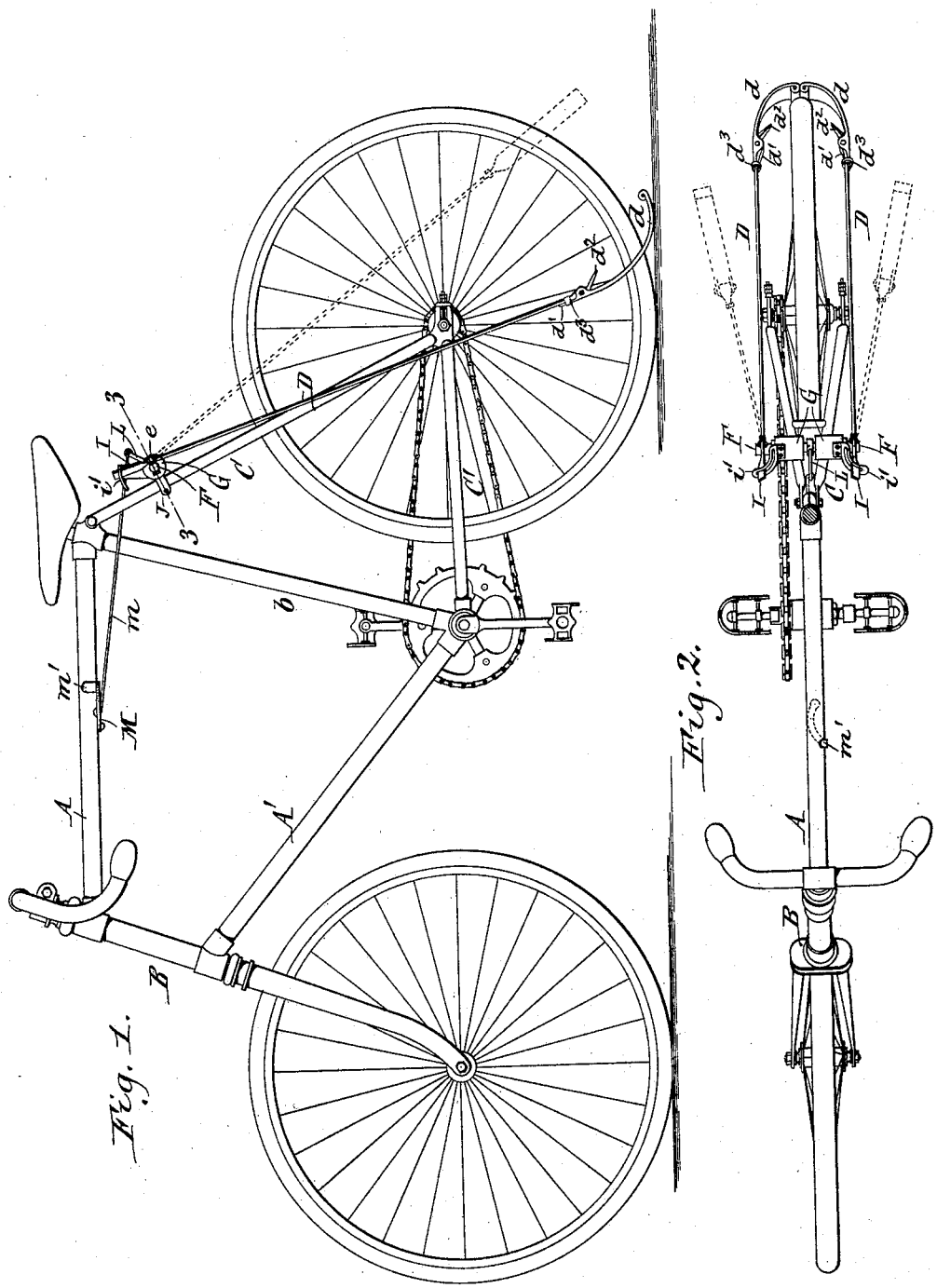

UNITED STATES PATENT OFFICE.

MICHAEL KELLY, OF BUFFALO, NEW YORK.

BICYCLE-SUPPORT.

SPECIFICATION forming part of Letters Patent No. 603,769, dated May 10, 1898.

Application filed April 22, 1897. Serial No. 633,371. (No model.)

*To all whom it may concern:*

Be it known that I, MICHAEL KELLY, a citizen of the United States, residing at Buffalo, in the county of Erie and State of New York, have invented new and useful Improvements in Velocipede-Supports, of which the following is a specification.

This invention relates to a support for velocipedes which is particularly applicable to bicycles.

The object of this invention is the production of a support of this character which is sightly and durable and which can be readily shifted into an operative or inoperative position.

In the accompanying drawings, consisting of two sheets, Figure 1 is a bicycle provided with my improved support. Fig. 2 is a top plan view thereof with the seat removed. Fig. 3 is a transverse section, on an enlarged scale, in line 3 3, Fig. 1, looking upward. Fig. 4 is a fragmentary side elevation, on an enlarged scale, of the means for shifting the cycle-support. Fig. 5 is a fragmentary top plan view of the same. Fig. 6 is a vertical section in line 6 6, Fig. 3. Fig. 7 is a bottom plan view of the upper front bar of the cycle-frame and the adjacent parts of the support-shifting mechanism. Fig. 8 is a fragmentary perspective view of one of the rock-shafts and the shifting arm. Fig. 9 is a fragmentary perspective view of one of the supporting shoes or feet and its leg.

Like letters of reference refer to like parts in the several figures.

Although my improved support is capable of being applied to various kinds of velocipedes, I have shown the same applied to a bicycle the frame of which consists, essentially, of upper and lower front bars A A', connected at their front ends by the steering-head B and at their rear ends by the saddle-post $b$, and upper and lower rear forks C C', connected with the rear ends of the upper and lower front bars A A'.

D D represent two inclined legs which are mounted on opposite sides of the rear portion of the cycle-frame and which are adapted to be lowered upon the ground for supporting the bicycle or to be raised from the ground when the support is not required. To the lower end of each leg is pivoted a curved foot or shoe $d$, which is adapted to rest on the ground and which can be folded against the leg, so as to make the bicycle more compact for storage and transportation. The bearing-foot is provided on opposite sides of its pivot with locking-arms $d'$ $d^2$, either one of which may be locked against the foot by a longitudinally-movable locking-sleeve $d^3$, arranged on the supporting-leg. In the unfolded position of the foot its front arm $d'$ bears against the front side of the supporting-leg and is held in this position by sliding the sleeve over the same, as represented in full lines in Fig. 9. Upon folding the foot, as shown in dotted lines, Fig. 9, the front arm $d^2$ bears against the rear side of the leg and can be held in this position by sliding the sleeve $d^3$ over the same.

Each of the supporting-legs is journaled transversely with its upper portion in a spindle $e$, but is held against lengthwise movement thereon by shoulders $e'$ $e'$, formed on the leg on opposite sides of the spindle, and the latter is journaled transversely in the outer end of a horizontal rock-shaft F, but held against longitudinal movement therein by means of shoulders $e^2$ $e^2$, formed on the spindle on opposite sides of the rock-shaft. Upon turning the rock-shaft the supporting-leg is moved toward or from the ground, and upon turning the spindle the leg is moved toward or from the rear wheel of the bicycle for the purpose of folding the same closely when not in use, as represented in full lines, Fig. 2, or projecting the same laterally when in use, as represented in dotted lines, Fig. 2, so that it will brace the bicycle more effectively. By turning the leg in the spindle the curved foot at its lower end may be turned one-quarter, so that it passes behind the rear wheel, as represented in full lines in Fig. 2, thereby rendering the bicycle more sightly and also preventing the foot $d$ from being caught when riding close to other objects. The rock-shaft passes transversely through a hollow casing G, which is mounted on one of the members of the upper rear fork and is journaled near its inner and outer ends in bearings $g$ $g'$, formed in the ends of the casing, but is held against longitudinal movement therein by means of shoulders $ff$, arranged on the shaft and abutting against the inner and outer ends of the casing.

H is a spring whereby the rock-shaft is turned in the direction for holding the supporting-leg yieldingly in a depressed position. This spring is arranged in the casing around the rock-shaft and secured with its ends to the rock-shaft and to the casing. When the supporting-legs are lowered upon the ground, they hold the bicycle upright while at rest or while the same is being propelled, in which latter case the shoes on the legs trail over the ground and sustain the bicycle, which is desirable for persons learning to ride the bicycle or for riding very slow in crowded thoroughfares to avoid dismounting.

Each supporting-leg is provided above its pivot with an upwardly-projecting arm I, which engages with its flattened end in a curved guide or cam-slot $i$, formed in a bracket $i'$, secured to the casing G. This slot is so formed that when the leg is raised by the rock-shaft the guide-arm will be shifted so as to move the leg inwardly toward the rear wheel and at the same time turn the leg so that its shoe or foot folds behind the wheel, and when the leg is lowered by the rock-shaft the guide-arm is shifted by the guide-slot, so that the leg is moved away from the rear wheel and is turned so that the convex under side of its shoe or foot faces the ground. The spring-casing may be secured to the adjacent member of the upper rear fork in any suitable manner, preferably by means of a fixed jaw J, formed on the casing and embracing one side of the fork member, and a detachable jaw J', embracing the opposite side of the fork member and provided at one end with a hook $j$, which engages with a similar hook $j'$ on the casing, while its opposite end is connected with the fixed jaw by a screw $j^2$, as shown in Figs. 3 and 4.

The rock-shafts of both supporting-legs are arranged transversely in line, and their inner ends abut and are loosely coupled, so as to permit each leg in riding over an obstruction, when resting on the ground, to rise and fall independent of the other leg. This coupling consists, preferably, of a sleeve K, inclosing annular flanges or collars $k$ on the inner ends of the rock-shafts and provided with an internal flange $k'$ at one end, which bears against the outer side of the flange on one of the rock-shafts, and an externally-screw-threaded ring $k^2$, which engages with an internal thread in the opposite end of the sleeve and bears against the outer side of the flange of the other rock-shaft.

The supporting-legs are simultaneously raised from the ground and held in an elevated position by the following mechanism:

$l$ represents a segmental notch or recess formed in the inner end of each rock-shaft, the recesses of both shafts facing each other and forming together a segmental slot. L is a lifting rock-arm arranged in the recesses of both shafts and passing through an opening $l'$ in the coupling-sleeve. The inner end of the rock-arm is secured to a horizontal trunnion or arbor $l^2$, arranged with its ends in the inner ends of the rock-shafts, which are made hollow for this purpose, and turns therein, thereby forming a pivot for the rock-arm and also aiding in keeping the rock-shafts in alinement. When the rock-arm is moved forwardly, it strikes the front ends of the recesses in both rock-shafts and turns the same, so that the supporting-legs are raised. Upon moving the rock-arm rearwardly to its fullest extent the springs H turn the rock-shafts in a reverse direction until the supporting-legs are lowered on the ground and the rock-arm is disengaged from the front ends of said recesses. When either of the supporting-legs is raised or lowered by riding over an obstruction or entering a depression, the segmental recess in its rock-shaft permits the supporting-leg to follow the variations of the surface of the ground without affecting the position of the other supporting-leg, thereby preventing the bicycle from tipping to one side when the same is propelled with the legs on the ground.

M represents a shifting lever which is connected by a rod $m$ with the rock-arm L and which is pivoted to the under side of the upper front bar of the cycle-frame. Upon moving the shifting lever forwardly the supporting-legs are raised, and upon moving the same rearwardly the legs are lowered. The free end of the lever is provided with a thumb-piece or handle $m'$, which is adapted to engage against the side of the upper front bar when the pivotal connection between the lever and rod has passed the dead-center at the end of its forward movement, thereby causing the pull of the springs H and the weight of the legs to lock the shifting lever in this forward position. When it is desired to lower the supporting-legs, it is only necessary to turn the shifting lever sufficiently to carry its pivotal connection with the rod past the dead-center, when the balance of the movement will be effected automatically.

I claim as my invention—

1. In a velocipede-support, the combination with the supporting-leg adapted to be movably connected with a velocipede-frame, of a bearing-shoe pivoted on said leg and provided with a locking-arm, and a locking-sleeve sliding on said leg and adapted to engage with said arm, substantially as set forth.

2. In a velocipede-support, the combination with the supporting-leg adapted to be movably connected with a velocipede-frame, of a bearing-shoe pivoted to said leg and provided on opposite sides of its pivot with locking-arms, and a locking-sleeve sliding on said leg and adapted to engage with either of said locking-arms, substantially as set forth.

3. In a velocipede-support, the combination with a rock-shaft adapted to be mounted on a velocipede-frame, of a spindle journaled transversely on said shaft, a supporting-leg journaled in said spindle so as to turn at an angle to the axis of the spindle and a laterally-projecting shoe arranged on the supporting-leg, substantially as set forth.

4. In a velocipede-support, the combination with a rock-shaft adapted to be mounted on a velocipede-frame, of a spindle journaled transversely on said shaft, a supporting-leg journaled in said spindle so as to turn at an angle to the axis of the spindle, a laterally-projecting shoe arranged at the lower end of the supporting-leg, a flat-sided arm arranged at the upper end of the supporting-leg, and a cam with which said arm engages, substantially as set forth.

5. In a velocipede-support, the combination with the supporting-legs, of transverse rock-shafts carrying said legs, bearings in which said shafts are journaled and which are adapted to be mounted on a velocipede-frame, and a coupling which connects the adjacent ends of the rock-shafts but permits each shaft to turn independent of the other, substantially as set forth.

6. In a velocipede-support, the combination with the supporting-legs, of transverse rock-shafts carrying said legs, bearings in which said shafts are journaled and which are adapted to be mounted on a velocipede-frame, and a rock-arm pivoted concentric with the shafts but loosely connected therewith, substantially as set forth.

7. In a velocipede-support, the combination with the bearings adapted to be mounted on a velocipede-frame, of hollow transverse rock-shafts journaled in said bearings and having their abutting inner ends provided with external annular flanges and with segmental recesses, supporting-legs arranged on the outer ends of the rock-shafts, a coupling-sleeve provided with internal shoulders which bear against the outer sides of the flanges of the rock-shafts, an arbor arranged with its ends in the inner ends of the hollow rock-shafts, and a rock-arm arranged in the recesses of both rock-shafts and in an opening in the coupling-sleeve and secured with its inner end to said arbor, substantially as set forth.

Witness my hand this 7th day of April, 1897.

MICHAEL KELLY.

Witnesses:
  WM. J. WARWICK,
  CHAS. A. DOUGHERTY.